US011130378B1

(12) United States Patent
Lambert

(10) Patent No.: US 11,130,378 B1
(45) Date of Patent: Sep. 28, 2021

(54) ADJUSTABLE CONTROL ARM AND METHOD OF USING THE SAME TO ADJUST CAMBER

(71) Applicant: Justin Lambert, Bakersfield, CA (US)

(72) Inventor: Justin Lambert, Bakersfield, CA (US)

( * ) Notice: Subject to any disclaimer, the term of this patent is extended or adjusted under 35 U.S.C. 154(b) by 0 days.

(21) Appl. No.: 16/877,926

(22) Filed: May 19, 2020

Related U.S. Application Data

(60) Provisional application No. 62/927,933, filed on Oct. 30, 2019.

(51) Int. Cl.
*B60G 7/00* (2006.01)

(52) U.S. Cl.
CPC ............ *B60G 7/003* (2013.01); *B60G 7/005* (2013.01); *B60G 7/008* (2013.01); *B60G 2204/148* (2013.01); *B60G 2204/416* (2013.01); *B60G 2204/4402* (2013.01); *B60G 2204/61* (2013.01); *B60G 2206/124* (2013.01); *B60G 2206/91* (2013.01)

(58) Field of Classification Search
CPC ........ B60G 7/003; B60G 7/005; B60G 7/008; B60G 2206/91; B60G 2206/124; B60G 2204/4402; B60G 2204/148; B60G 2204/61; B62D 17/00
See application file for complete search history.

(56) References Cited

U.S. PATENT DOCUMENTS

| 1,598,482 | A  | * | 8/1926  | Lance ................... | B60G 7/005 |
| | | | | | 403/135 |
| 7,278,648 | B2 | * | 10/2007 | Bobbitt, III ........... | B60G 7/003 |
| | | | | | 280/124.123 |
| 7,513,514 | B1 | * | 4/2009  | Schlosser .............. | B60G 7/005 |
| | | | | | 280/86.751 |
| 10,518,597 | B1 | * | 12/2019 | Smith .................... | B60G 7/006 |
| 2004/0094924 | A1 | * | 5/2004 | Jones .................... | B60G 3/20 |
| | | | | | 280/86.75 |
| 2006/0070481 | A1 | * | 4/2006 | Kim ..................... | B60G 17/0163 |
| | | | | | 74/519 |
| 2007/0102894 | A1 | * | 5/2007 | Derisi ................... | B62K 5/08 |
| | | | | | 280/86.751 |

(Continued)

FOREIGN PATENT DOCUMENTS

| KR | 20040015949 A | * | 2/2004 | ............ B62D 17/00 |
| KR | 20090045731 A | * | 5/2009 | ............... B60G 7/02 |
| WO | WO-2016144330 A1 | * | 9/2016 | ............. B60G 3/265 |

OTHER PUBLICATIONS

Kim Dong Hyeon, 'Translation of KR 20040015949 A Obtained Jun. 28, 2021', Feb. 2004, Entire Document (Year: 2004).*

*Primary Examiner* — Paul N Dickson
*Assistant Examiner* — Scott F. Underwood
(74) *Attorney, Agent, or Firm* — James M. Duncan; Scanlon Duncan LLP

(57) ABSTRACT

A suspension link, such as a control arm, has a detachable ball joint end which attaches to a ball joint connected to the wheel hub of a vehicle. The detachable ball joint end also attaches to a housing member of an opposite facing intermediate portion of the suspension link. There is an adjustable set off between opposite facing surfaces of the detachable ball joint end and the housing member. Adjustments in the set off, which adjust the camber of the vehicle wheel, may be made by placing one or more shims between the detachable ball joint end and the bolt housing.

13 Claims, 7 Drawing Sheets

(56) References Cited

U.S. PATENT DOCUMENTS

| | | | |
|---|---|---|---|
| 2016/0059652 A1* | 3/2016 | Weifenbach | B62D 17/00 |
| | | | 280/86.757 |
| 2018/0290511 A1* | 10/2018 | Gordon | B60G 17/00 |
| 2020/0010114 A1* | 1/2020 | Gordon | F16C 9/04 |
| 2020/0010115 A1* | 1/2020 | Czajkowski | B60G 7/005 |
| 2020/0361266 A1* | 11/2020 | Kuribayashi | B60G 15/067 |

* cited by examiner

ADJUSTABLE CONTROL ARM AND METHOD OF USING THE SAME TO ADJUST CAMBER

BACKGROUND OF THE INVENTION

The invention generally relates to vehicular suspensions. The present invention more specifically relates to suspension links between the vehicle chassis and wheel hub. Suspension links include control arms, which are also referred to as radius rods or control links. Control arms generally triangularly shaped, with each control arm typically having an upper control arm component and a lower control arm component. Each wheel of the vehicle will typically have a control arm attached to the respective wheel hub, so there are front control arms and rear control arms. The front control arm has a ball joint end which attaches to a spindle at the wheel hub, which enables the front suspension knuckle/spindle to rotate and pivot. The front control arm also has a pivot end which allows the control arm to pivot with respect to the chassis. Rear control arms may pivot on bushings at both ends.

Control arms locate the wheels in relation to the body and allow them to move within a designed range in response to the road and the suspension. They may pivot on bushings at both ends, like rear suspension control arms, or they may have a ball joint at one end, to enable a front suspension knuckle/spindle to rotate and pivot for steering.

Adjusting wheel camber is made by adjusting the control arm with respect to the chassis and the wheel hub. For example, if the chassis has a slotted bolt hole for attachment of the pivot end of the control arm, camber may be adjusted by sliding the control arm attachment bolt along the slot and tightening the bolt and nut when the desired camber is obtained. However, most vehicles are manufactured with round bolt holes for securing the control arms, resulting in a fixed pivot location. For vehicles having fixed pivot locations, the control arm itself must have some type of adjustment mechanism to provide for camber adjustments.

One known mechanism for camber adjustment is to have a threaded rod end (aka "ball joint end") on at least one end of the control arm. However, it is to be appreciated that for these configurations the ball joint end of the control arm, because of the required orientation for engaging the ball joint, can only be rotated in 180-degree increments. The pivot ends are typically not rotatable, or if rotatable, also only in 180-degree increments. These configurations make it difficult to fine tune the camber adjustment. Some control arms have threaded rod ends on each end of the control arm, which allow additional adjustment, but such adjustment only works if the control arm is straight. Some control arms provide camber adjustment by utilizing a pivot bar which fastens to the chassis and then shims are utilized to adjust the camber. Other control arms utilize cam-shaped camber plates which allow the pivot end of the control arm to be pivoted to achieve camber adjustment. Still other control arms have threaded adjusters in each arm which are used with jam nuts to allow the arm to function like a tie rod or turnbuckle.

In addition to automobiles, embodiments of the present invention can be utilized on all-terrain vehicles ("ATVs") and utility task vehicles ("UTVs"), which can present an additional issue. Many of these vehicles have suspension links or lower control arms which are not straight, but rather are angled to increase ground clearance. This type of control arm does not allow rotation of the bar as necessary to make adjustments for a threaded rod end type of control arm.

SUMMARY OF THE INVENTION

Embodiments of the present invention provide an elegant solution to the problems discussed above by providing a suspension link, such as a control arm, having a detachable ball joint end which attaches to a ball joint connected to the wheel hub of a vehicle. The detachable ball joint end also attaches to a housing member of an opposite facing intermediate portion of the suspension link. There is an adjustable set off between opposite facing surfaces of the detachable ball joint end and the housing member. Adjustments in the set off, which adjust the camber of the wheel, are made by placing one or more shims on a fastener which connects the detachable ball joint end and the housing member. Fine tuning of the camber adjustment may be further achieved by utilizing shims of different thicknesses. The detachable ball joint end may be utilized with any geometry of suspension link or control arm For example, a suspension link may have a geometry configured for maximum ground clearance but still allowing fine tuning of the camber adjustment, which is of considerable benefit for ATVs and UTVs.

DETAILED DESCRIPTION

For the purposes of the present disclosure, the terms "inward," "inwardly," "outward," and "outwardly" refer to the orientation of a vehicle, with "inward" and "inwardly" referring to a direction toward the chassis of the vehicle and "outward" and "outwardly" referring to a direction toward the wheels of the vehicle.

Figure 1:
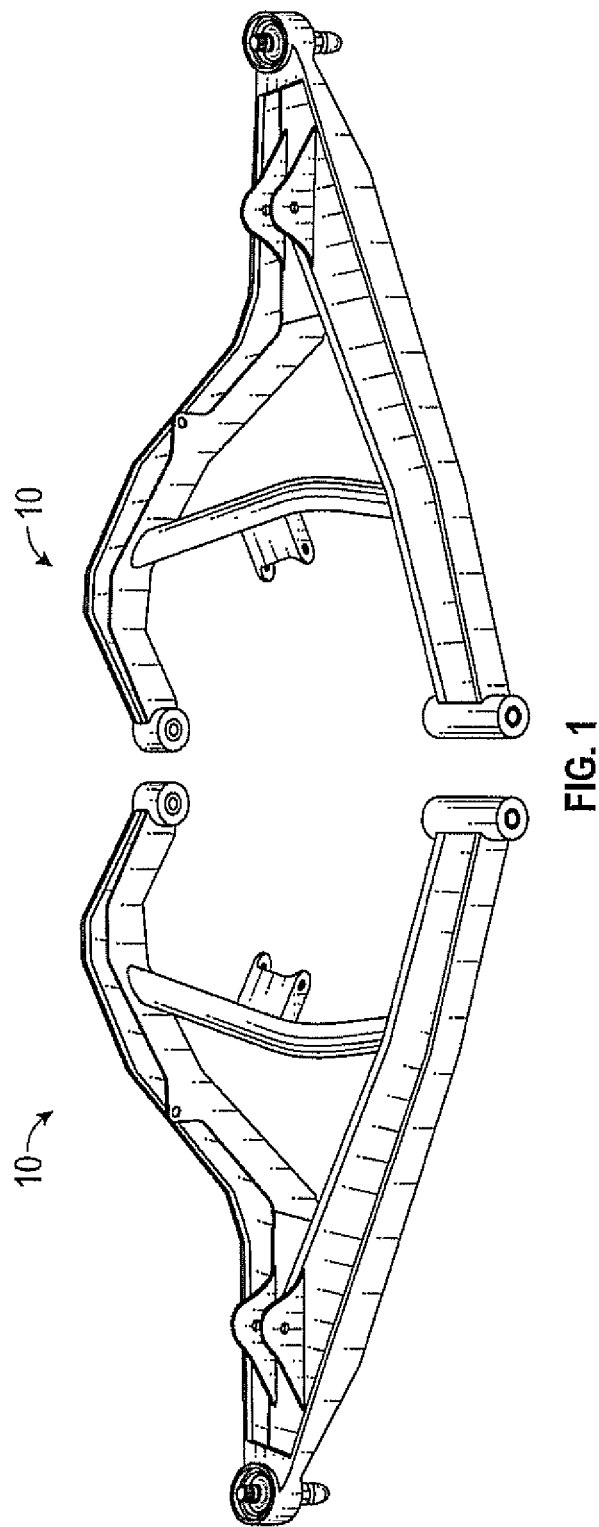
FIG. 1 depicts a top perspective view of an embodiment of a front upper control arm which may be utilized with embodiments of the present invention.
Figure 2:
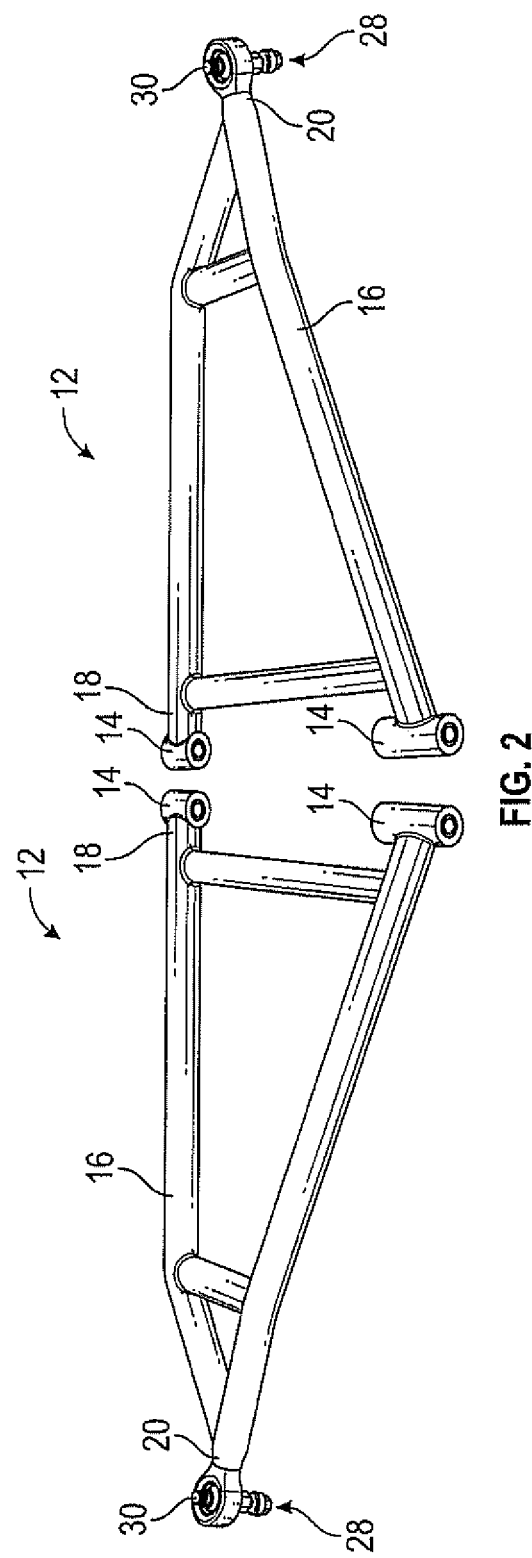
FIG. 2 depicts a top perspective view of an embodiment of a front lower control arm of the present invention having the detachable ball joint end, shown in greater detail in FIG. 3B.

Referring now to the figures, FIGS. 1 and 2 respectively depict right and left side upper control arms 10 and lower control arms 12, where the control arms are the types of suspension links which may utilize embodiments of the present invention. The presently disclosed invention provides for making fine adjustments to the camber of the wheels of a vehicle. The presently disclosed invention will typically be utilized on lower control arms 12, although different applications may justify utilizing the invention on other suspension links.

In some embodiments, lower control arm 12 may have a triangular configuration with cross-members extending between the side rails. Lower control arm 12 has an end 14 which attaches to a chassis (not shown) of a vehicle. For the embodiment depicted in FIG. 2, the lower control arms 12 are configured to pivotally attach to the chassis. Ends 14 of this embodiment are configured to house bushings which receive the hardware which attaches to the chassis. Lower control arms 12 may have an intermediate section 16 which has an inward end 18 having ends 14 and an outward end 20.

Figure 3A:
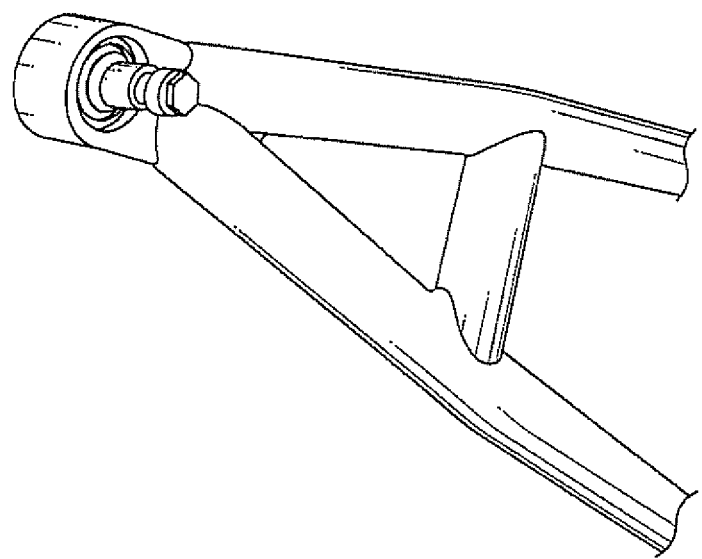
FIG. 3A shows a prior art ball joint end of an upper control arm without the present invention and FIG. 3B shows an upper control arm with the invention.
Figure 3B:
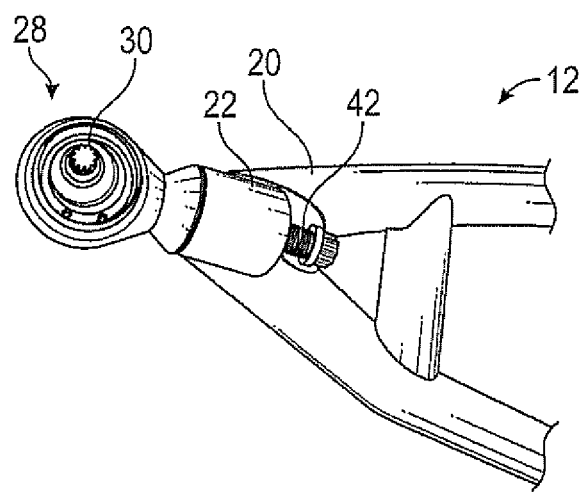
Figure 4:
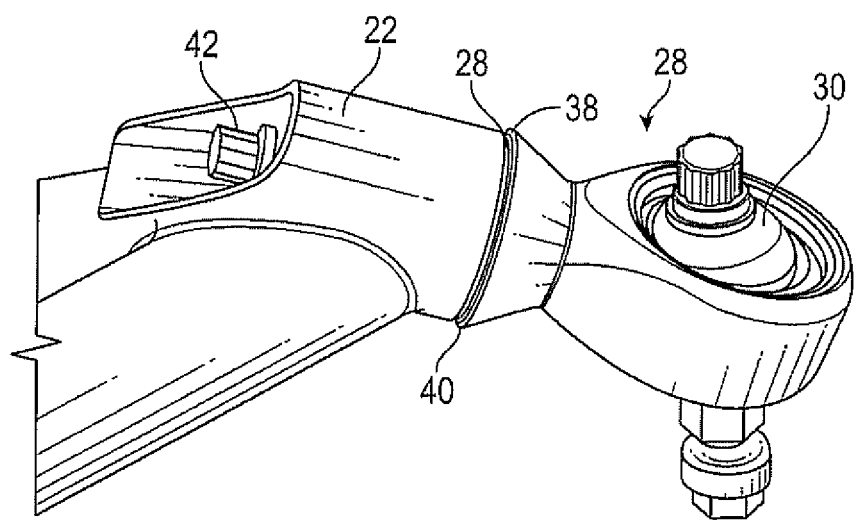
FIG. 4 depicts an embodiment of an adjustable ball joint end of the present invention.
Figure 5:
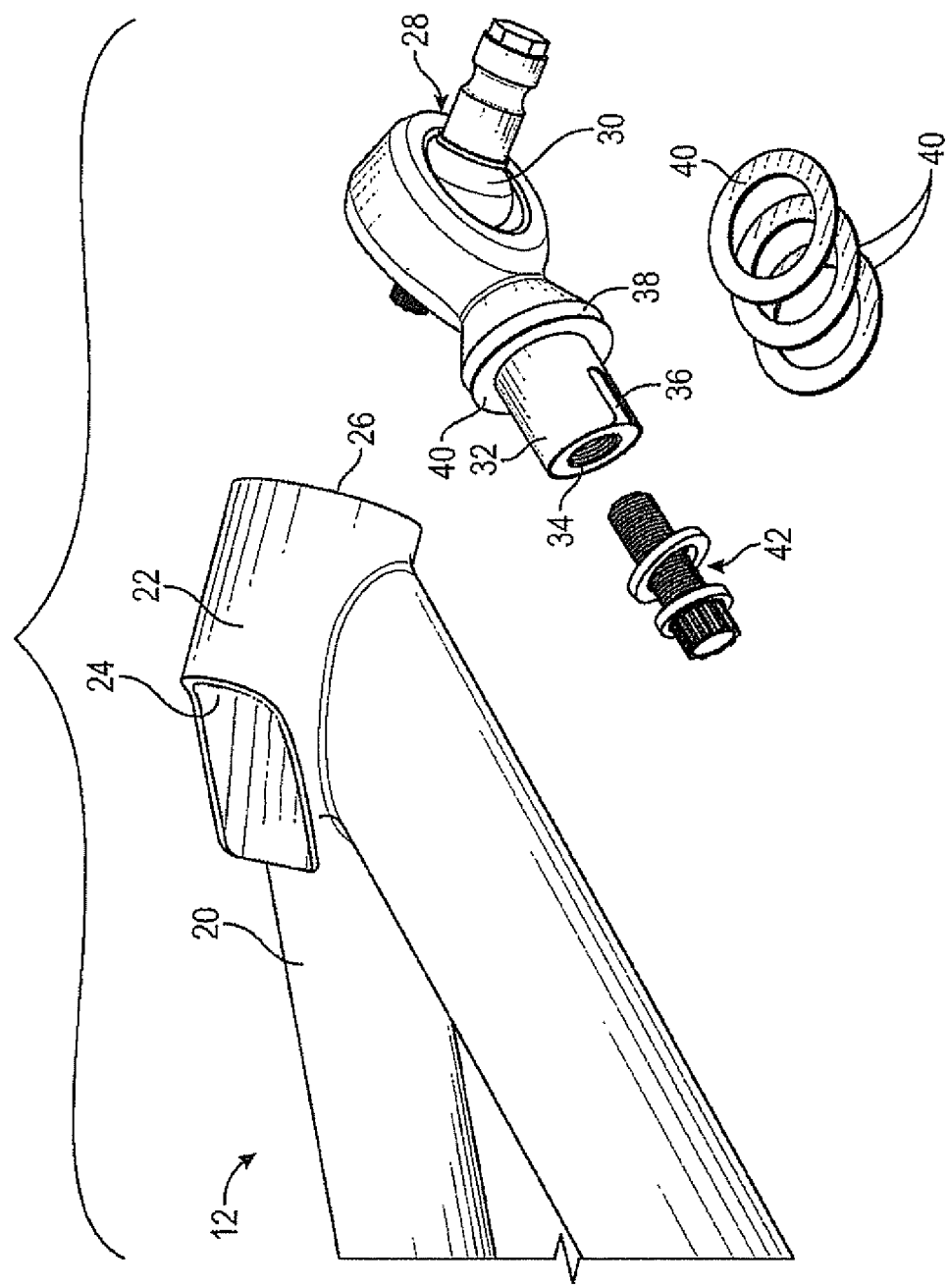
FIG. 5 shows an exploded view of an adjustable ball joint end of the present invention.

As best depicted in FIGS. 3B, 4 and 5, outward end 20 has a housing member 22 attached to it. Housing member 22 has an interior aperture 24 which extends throughout the length of housing member 22, terminating at an outward facing surface 26 of the housing member 22.

An embodiment of the invention further comprises an end member 28, also referred to herein as a detachable ball joint housing. End member 28 provides an eyelet which is configured to receive and retain ball joint 30. End member 28 has a sleeve member or boss 32 which may is within interior aperture 24 of the housing member 22 of the outward end 20 of control arm 12.

Sleeve member 32 has an aperture 34 having internal threads. Sleeve member 32 may further comprise a keyway 36 which engages a key (not shown) of interior aperture 24 of the housing member 22 to prevent rotation of end member 28 with respect to housing member 22. End member 28 has an inward facing surface 38 which, when the components are assembled, is in opposite facing relation with outward facing surface 26 of housing member 22. An adjustable set-off is defined between outward facing surface 26 and inward facing surface 38, where the set-off may be adjusted by setting shim members 40 between the two surfaces. A fastener 42 may be utilized to attach end member 28 to housing member 22, where one or more shim members 40 may be disposed along sleeve 32 between outward facing surface 26 and inward facing surface 38.

Figure 6:
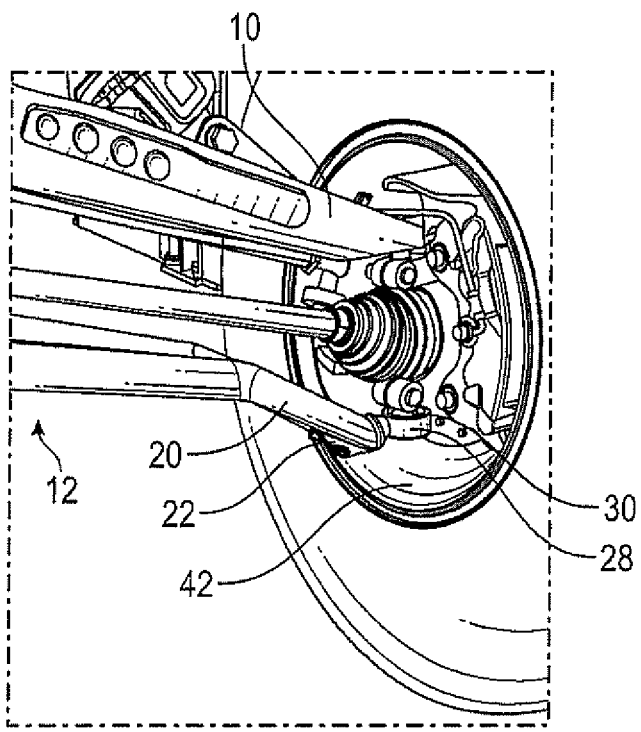
FIG. 6 depicts an upper and lower control arm of the present invention mounted to a wheel hub of a vehicle.
Figure 7:
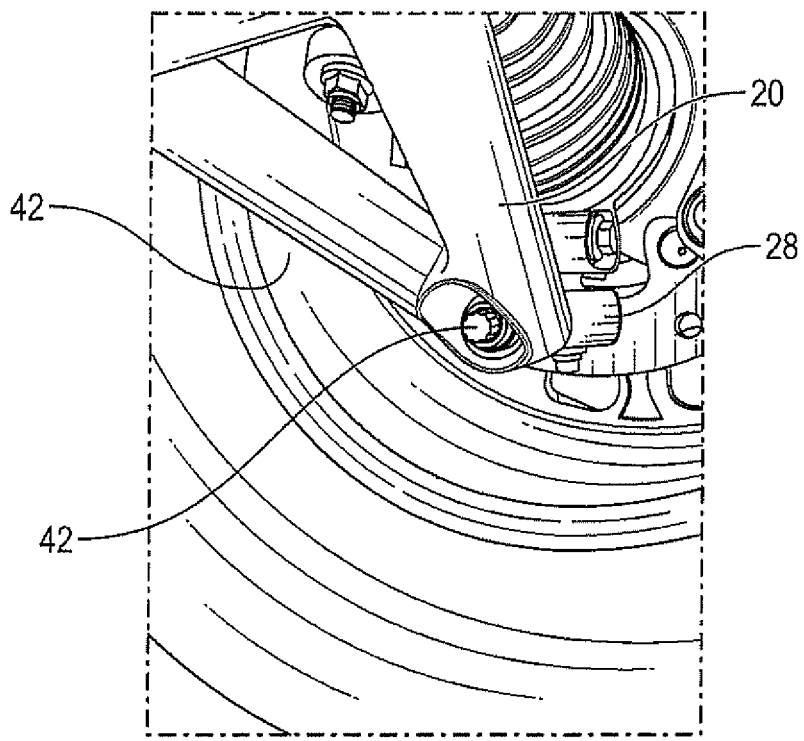
FIG. 7 is a close-up view of a lower control arm of the present invention mounted to a wheel hub of a vehicle.

FIGS. 6 and 7 depict embodiments of upper control arm 10 and lower control arm 12 attached to a wheel hub 44 of a vehicle, showing how the end member 28 attaches to ball joint 30 and the positioning of the end member 28 with respect to the wheel hub.

Figure 8:
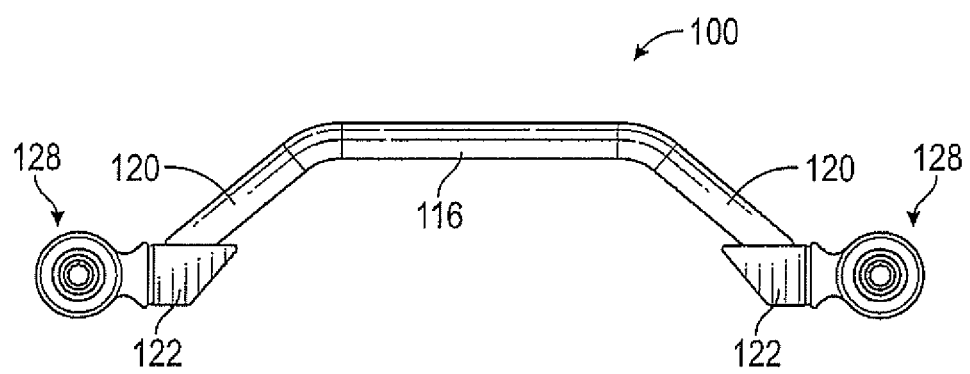
FIG. 8 illustrates how a suspension link may be configured to provide greater ground clearance for a vehicle, such as for an ATV or UTV.

An alternative embodiment of a suspension link 100 is depicted in FIG. 8. Suspension link 100 may be utilized on an ATV. In this embodiment, suspension link 100 has a configuration in which intermediate section 116 has an angled configuration which provides greater ground clearance for the vehicle. In this embodiment, either end of suspension link 100 may attach to the chassis of a vehicle (not shown) of a vehicle. Intermediate section 116 has outward ends 120, each having housing members 122. End members 128 are attached to housing members 122, where end members 128 and housing member 122 are configured the same as end members 28 and housing members 22 discussed above.

Embodiments of the present invention may be utilized in a method of adjusting the camber of a vehicle wheel. In an embodiment of the method, inward facing surface 38 of the end member 28 is positioned into an opposite facing relation with outward facing surface 26 at the outward end 20 of the suspension link 12. Fastener 42 is aligned to connect end member 28 with the outward end 20. One or more shims may be placed on sleeve 32, with the shim placed to adjust the set-off between the inward facing surface 38 and the outward facing surface 26. The fastener 42 is tightened securing the end member 28 to the outward end 20 of the suspension link 12, thereby sandwiching the shim between the inward facing surface 38 and the outward facing surface 26, thereby adjusting the wheel camber. Multiple shims 40 may be utilized, with the thickness of each shim varied as desired.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A suspension link for a vehicle comprising:
a first end for attachment to a chassis of the vehicle;
an intermediate section having an inward end attached to the first end and an outward end, the outward end comprising a housing member having an outward facing surface; and
a detachable ball joint housing having an inward facing surface, wherein the detachable ball joint housing comprises a sleeve wherein the sleeve is configured to be received within the housing member, wherein the detachable ball joint housing attaches with a fastener to the housing member with the outward facing surface and the inward facing surface in opposite facing relation defining an adjustable set-off.

2. The suspension link of claim 1 wherein a first shim is disposed on the sleeve of the detachable ball joint housing, wherein the sleeve comprises the inward facing surface, wherein the first shim is disposed within the adjustable set-off.

3. A method of adjusting the camber of a wheel utilizing the apparatus of claim 1 comprising the following steps:
loosening the fastener which attaches the detachable ball joint housing to the housing member until an end of the fastener is free;
placing a shim on the sleeve of the detachable ball joint housing to reach a desired camber;
reattaching the end of the fastener to the detachable ball joint housing; and
tightening the fastener until the shim is tightly sandwiched between the outward facing surface and the inward facing surface.

4. The suspension link of claim 1 wherein the sleeve comprises an aperture having internal threads configured to receive the fastener.

5. The suspension link of claim 1 wherein the intermediate section comprises an angled section configured to provide a greater ground clearance for the vehicle.

6. The suspension link of claim 1 wherein the first end is pivotally attached to the vehicle.

7. A method of making a camber adjustment to a wheel comprising the following steps:
attaching a detachable ball joint housing of a suspension link to a ball joint of a wheel hub, wherein the detachable ball joint housing comprises a sleeve;
positioning an inward facing surface of the sleeve of the detachable ball joint housing in an opposite facing relation with an outward facing surface of a housing member an outward end of a suspension link, wherein the sleeve is configured to be received within the housing member, the suspension link having an inward end attached to a vehicle, wherein an adjustable set-off is defined between the inward facing surface and the outward facing surface;

aligning a fastener to connect the outward end of the suspension link to the detachable ball joint housing;

setting the adjustable set-off to achieve a desired camber adjustment; and tightening the fastener to secure the desired camber adjustment.

8. The method of claim 7 wherein a shim is disposed in the adjustable set-off prior to tightening the fastener.

9. A suspension link for a vehicle comprising:

a first end for attachment to a chassis of the vehicle;

an intermediate section having an inward end connected to the first end and an outward end comprising a housing member having an outward facing first surface;

an interior aperture set through the housing member, the interior aperture extending through the housing member to the outward facing first surface;

an end member comprising a ball joint housing adapted to receive and retain a ball joint, the end member further comprising a sleeve member attached to the ball joint housing, the end member further comprising an inward facing second surface at a terminus of the sleeve member, wherein the outward facing first surface and the inward facing second surface are in opposite facing relation, wherein an adjustable set-off is defined between the outward facing first surface and the inward facing second surface;

a fastener which attaches the end member to the intermediate section; and at least one shim member disposed on the sleeve member in the adjustable set-off.

10. The suspension link of claim 9 wherein the sleeve member is configured to be received within the interior aperture of the housing member.

11. The suspension link of claim 9 wherein the intermediate section comprises an angled section configured to provide a greater ground clearance for the vehicle.

12. The suspension link of claim 9 wherein the first end is pivotally attached to the vehicle.

13. The suspension link of claim 9 wherein the intermediate section comprises a left-side member and a right-side member in a triangular configuration, with left side member and right member conjoined at the outward end.

* * * * *